United States Patent
Kügler

[11] Patent Number: 5,857,809
[45] Date of Patent: Jan. 12, 1999

[54] METHOD FOR THE SEALING OF SOIL FORMATIONS

[76] Inventor: Jost-Ulrich Kügler, Im Teelbruch 61, 45219 Essen, Germany

[21] Appl. No.: 640,870
[22] PCT Filed: Sep. 18, 1995
[86] PCT No.: PCT/EP95/03674
§ 371 Date: May 15, 1995
§ 102(e) Date: May 15, 1996
[87] PCT Pub. No.: WO96/08611
PCT Pub. Date: Mar. 21, 1996

[30] Foreign Application Priority Data
Sep. 16, 1994 [DE] Germany ............ 44 33 079.0

[51] Int. Cl.$^6$ ............ E02D 31/00; C09K 17/02; C09K 17/12
[52] U.S. Cl. ............ 405/263; 405/128
[58] Field of Search ............ 405/263, 264, 405/271; 404/76

[56] References Cited

U.S. PATENT DOCUMENTS

| | | |
|---|---|---|
| 2,227,653 | 1/1941 | Langer . |
| 4,042,410 | 8/1977 | Ito ............ 106/117 |
| 4,329,428 | 5/1982 | Ghosh et al. ............ 435/167 |
| 4,539,121 | 9/1985 | Kapland et al. ............ 210/751 |
| 5,051,031 | 9/1991 | Schumacher et al. ............ 405/129 |
| 5,141,362 | 8/1992 | Kügler ............ 405/128 |
| 5,201,608 | 4/1993 | Kügler ............ 405/129 |

FOREIGN PATENT DOCUMENTS

| | | |
|---|---|---|
| A 0 125 680 | 11/1984 | European Pat. Off. . |
| WO A 89 01547 | 2/1989 | European Pat. Off. . |
| 0 338 039 | 10/1989 | European Pat. Off. . |
| A 0 404 999 | 1/1991 | European Pat. Off. . |

Primary Examiner—Tamara L. Graysay
Assistant Examiner—Frederick L. Lagman
Attorney, Agent, or Firm—Frohwitter

[57] ABSTRACT

A method for the sealing of soil formations, a mineral sealing layer consisting of cohesive soil and of an aggregate being applied to the soil formation and then being compacted mechanically, the aggregate used being dry, sewage or water sludge with a dry substance content of at least 70% by weight (sludge TS≧70) in a quantity 5 to 50% by weight in relation to sludge dry substance and calculated on the dry weight of the soil.

33 Claims, 2 Drawing Sheets

METHOD FOR THE SEALING OF SOIL FORMATIONS

In the production of mineral sealing layers for base and surface seals of dumps and old loads, as a result of precipitations considerable building problems arise in the installation of the sealing material, since, in the case of an increased water content and by virtue of the additional absorption of water during precipitations, the sealing material becomes very soft when it is compacted and is therefore no longer capable of being processed. Sealing layers which are too wet then often have to be removed again. Necessary dump sealing work has also repeatedly had to be discontinued on account of poor weather conditions, thus incurring high standstill costs.

In order to obtain the requisite sealing qualities even in changing weather conditions, the setting up of protective tents over the construction stages or repeated covering of the production stages with foils to repel precipitations have proved to be a necessary temporary protective measure.

Despite these highly cost-intensive protective measures, there continues to be considerable installation difficulties, in that the initial material (clay, clayey silt) often already has excessively high initial water contents at the extraction point and, with this water content, is not capable of being processed and compacted. Redrying measures have conventionally been carried out for a long time in earthwork engineering, highway construction and hydraulic engineering. Quick lime or cement are used as redrying materials in the so-called lime or cement stabilization. It is thus possible for the water content of overwetted cohesive soil layers to be redried by the addition of 4–10% by weight of cement or lime as a result of the absorption of water by the cement or lime, in such a way that these soil layers acquire a crumbly structure and are easily compactible again. However, a soil treated in this way is susceptible to cracking, as early as during processing, on account of its brittle behavior. Furthermore, plasticity is lost as a consequence of the hydraulic set. The compacted set soils are semi-solid to solid. Because of these properties, this common stabilization method for the installation of mineral sealing layers is ruled out. Hydraulic additives are therefore not permitted for dumps.

It has been shown, in practice, that in the case of increased water contents of 1 to 3% above the water content of the Proctor curve in the wet range, dry active finely ground clay, such as, for example, bentonite, can be admixed with the cohesive soil material. In this case, the added quantity is around 2 to 8% by weight. As a result of the water absorbency of the active finely ground clay, the cohesive soil mixture is redried and is then compactible. However, if overwetted soils, which have a pulpy consistency on account of the water content and the flow properties according to ATTERBERG (test to DIN 18.122), have to be used, this method can no longer be adopted directly for dump construction and for earth-work engineering.

The milling method no longer guarantees sufficient homogenization of the material, and intermixing in a positive mixer is necessary.

Because large quantities of clay minerals are mixed in, the sealing layer becomes extremely sensitive to weather conditions. On account of the high water absorbency of the finely ground clay, the least amounts of precipitation immediately bring about a pronounced variation in consistency. An initially rollable sealing mixture becomes no longer processible even under only slight precipitation effects and softens to a great depth, so that it is no longer possible to install the next sealing layer by means of earthmoving appliances, since these appliances break into the soft layer.

Drying out in dry weather conditions requires a period of several days. In addition, in drying out of this kind, shrinkage cracks occur shortly after compaction, so that a new processing of the layer at least by milling and compaction is necessary.

In the redrying method with active finely ground clay, it has proved a disadvantage that the susceptibility to cracking of mineral sealing layers improved in this way is greatly increased by the intensified shrinkage behavior during drying out, particularly under the shielding effect of plastic sealing sheets in the base and surface region.

As a further redrying method, it is known to dry overwet clayey or loamy soils thermally so that they regain their installability.

The mixing in of dry, fine aggregates, such as ground basalt and redried sand, power station ash, blast furnace slags and dusts, is also known. In this method, however, the extent of redrying is limited, since only a relatively small quantity of water can be absorbed as a result of the surface wetting of such dry aggregates. However, in the case of mixing into clays or silts, the addition of relatively large quantities of dry powders and/or sands to acquire processibility leads to a considerable impairment of the coefficient of permeability and has also not been practiced hitherto.

Furthermore, it is known from EP-B-0,338,039 that artificial fine-grained soil mixtures, such as sewage sludge, can be treated by the addition of dry granular aggregates, such as combustion ash, dusts or dried recycling sands, to form a compactible and sealing installation mixture. As already described above, however, aggregates of this type may not be added in any desired quantity, since, otherwise, the sealing values required are not achieved. The sewage or water sludges used are mechanically drained and chemically conditioned sludges with water contents of 70% or more.

The Technical Directives, TA Waste and TA Domestic Waste, assume that the mineral sealing component of a combination seal, consisting of a 50 cm thick seal composed of clayey cohesive soils with a plastic sealing sheet resting on it, is the most important sealing component which is to be permanently effective. As a starting material for the mineral sealing component, clay is mentioned as quality-orienting sealing material in terms of its consistency, mineral structure and stability.

It has emerged, however, that clayey seals, on account of their high shrinkage behavior and the mechanical stress prevailing in dumps, for example as a result of subsidence, are highly susceptible to cracking and thus permanently jeopardize the sealing quality. It is also known that, in summer, mineral surface seals diminish their water content by several percentage points to a depth of a few meters, thus likewise leading to the formation of shrinkage cracks.

In order to counteract this harmful behavior, active crack protection according to EP-B-0,409,999 was introduced. This is the reinforcement of the mineral sealing system by means of a slightly stretchable thin fabric, resistant to dump percolating water, for the absorption of tensile stresses and consequently for minimizing and distributing cracks counter to deformations, with the overlaying of a so-called fluidized bed which, when cracks occur, is capable of filling these again immediately with very fine soil, of thus preventing a widening of the crack by erosion and of consequently maintaining the sealing effect permanently.

Furthermore, proposals have been made, to the effect of producing a dry seal in a special grain size distribution, with the admixture of dry clay minerals which exert a sealing effect only when the durability of a plastic sealing sheet is no longer ensured. The sealing system is then to become effective as a result of the inflow of water. Admittedly, shrinkage cracks can be ruled out in the dry state; nevertheless, since a soaking of the earth cannot be ruled out in the long term, here too the material-specific shrinkage behavior takes effect.

In principle, however, the TA Waste and TA Domestic Waste currently require a combination seal in the base region for the sealing of dump surfaces. This is a mineral seal composed of very fine grained cohesive soil which must be equivalent to a clay in terms of plasticity, sealing effect and water retention, with a plastic sealing sheet lying above it in a composite pressed structure. The difficulties in execution, which are associated with this and are caused by weather conditions, and the susceptibility of mineral sealing layers to cracking, are described above. Moreover, combination seals are very expensive.

It has now been found that the abovementioned difficulties caused by weather conditions when the water contents of the soil to be installed are too high are overcome and, at the same time, the susceptibility of cohesive soils to cracking is improved, if dry, sewage or water sludge is added to the overwetted cohesive soil.

The subject of the invention is, therefore, a method for the sealing of soil formations, a mineral sealing layer consisting of cohesive soil and of an aggregate being applied to the soil formation and then being compacted mechanically, said method being defined in that the aggregate used is dry, sewage or water sludge with a dry substance content of at least 70% by weight (sludge $TS \geq 70$) in a quantity 5 to 50% by weight in relation to sludge dry substance and calculated on the dry weight of the soil.

Cohesive mineral soils suitable according to the invention are mixed-grain and fine-grain soils to DIN 18196. These include, in particular, silty, loamy and clayey soils with a more or less large sand fraction. Suitable examples are described in DIN 18196 and in Ullmanns Enzyklopädie technischen Chemie [Ullmann's Encyclopedia of Industrial Chemistry], 4th edition, volume 6 (1981).

The dry sludge used according to the invention is sewage or water sludge with a dry substance content of 70% by weight or above (sludge $TS \geq 70$). Sludges of pulpy to pasty consistency normally have a dry substance content of 15 to 20% by weight which rises to 25 to 35% in the case of kneadable to semi-solid sludges, such as are obtained, for example, by screen drying. The water contents in the sludge can be brought at best to approximately 50% by mechanical drainage. For more substantial drainage, since natural drying is too time-consuming, only thermal drying comes into consideration, in this case flue gas driers, for example in the form of drum-type driers, rack driers, suspension driers, stream driers or fluidized bed driers, can be used. The dry sludges obtained are then present in coarse-grain crumbly form. However, thermal drying necessitates an extremely high energy consumption which is around 1000 kWh for the separation of 1 $m^3$ of sludge water. Thermal drying is therefore economically justified only when the high energy consumption is compensated by a corresponding saving of dump costs or heat recovery. As a consequence of the high dump costs, for example if TS 30 sewage sludge is purchased a reimbursement of 100 to 120 DM/$m^3$ is obtained, and if TD 90 sewage sludge is purchased a reimbursement of 400 DM/$m^3$ is obtained. The invention thus not only makes it possible to save valuable dump space, but the use of $TS \geq 70$ dry sludge is also associated with considerable financial benefits. Finally, because $TS \geq 70$ is used according to the invention, the burning of this can also be avoided, this being an inestimable advantage in light of the environmental ban aimed at reducing the $CO_2$ pollution.

It was found that, by means of the method of the invention, mineral sealing layers with considerably reduced shrinkage values and consequently a considerably diminished tendency to cracking can be produced. This effect is to be observed only in the use of dry sludge and not in the use of pulpy or kneadable sludges with a dry substance of max. 50%, regardless of the fact that a redrying of overwetted soils is not possible in the case of sludges of this type having a relatively high water content.

According to the invention, the dry sludge is used in a quantity of 5 to 50% by weight in relation to sludge dry substance and calculated on the dry weight of the soil. The dry sludge quantity used is preferably 10 to 30% by weight and particularly preferably 15 to 25% by weight.

The dry sludge is preferably used in ground form, care preferably being taken to ensure that the grain size is below 0.6 mm. In this case, grinding is preferably carried out in such a way that at least 60% by weight of the dry sludge has a grain size of below 0.2 mm.

According to the invention, the dry substance content of the dry sludge is at least 70% by weight, that is to say the maximum water content is around 30% by weight. There is per se no particular upper limit to the dry substance content. Since the removal of the last residues of water becomes increasingly difficult, however, a complete removal of water is too energy-consuming and is therefore not desirable if only for economic reasons. The water content of the dry sludge also depends to some extent on the water content of the cohesive soil. Obviously, the redrying effect of the dry sludge is the greater, the higher its dry substance content or the lower its water content. In the case of very wet soils, therefore, in order to avoid large quantities of clogged dry sludge, it will be advantageous to use a dry sludge having a high dry substance content, for example sludge $TS \geq 80$ or sludge $\geq 90$.

The conventional sewage and water sludges come under consideration as sources for the dry sludge. Admittedly, sewage sludge, particularly when it is not fully putrefied, is not bacteriologically stable, and, during the decomposition of the organic material, pronounced shrinkage and therefore an impairment in dump sealing ought per se to be expected. Surprisingly, however, it was shown that increased shrinkage does not occur. On the contrary, even a reduction in the shrinkage of the cohesive soil as a result of the addition of dry sludge is observed. This beneficial influence on the shrinkage behavior, so important for the sealing effect, is not be observed when wet sludges are added, as is proved by the comparative examples.

In a preferred embodiment, an improved sealing effect is achieved by adding to the mixture of cohesive soil and dry sludge pulverulent water glass in such a quantity as to result in a 3 to 10% by weight water glass solution in the soil water of the sealing mixture. At the same time, a further preferred procedure is to mix the pulverulent water glass, together with the dry sludge, with the cohesive soil in a single operation.

The expression "pulverulent" denotes, here, a finely particulate dry form, hence also includes flake-like, etc. Examples of suitable water glass are soda and potash water glasses, soda water glasses being preferred on account of their inexpensiveness. A particularly suitable commercial product is obtainable under the designation Deposil N.

In addition to the improvement in the sealing effect, particularly with regard to stability in time, a further advantage of the use of pulverulent water glass is its high retentivity in respect of harmful substances, for example heavy metals, which are to be encountered particularly in percolating waters of dumps.

The examples explain the invention. Unless specified otherwise, all the percentages relate to weight.

The raw materials listed below were used in the examples.

1. Clay from the Hünxe (Iduna Hall) clay pit with a grain size distribution according to FIG. 1.
2. Loess loam from Bochum-Kornharpen with a grain size distribution according to FIG. 1.
3. TS 90 sewage sludge (KS-TS 90), obtained by the thermal drying of domestic sewage sludge (original) with a grain size distribution according to the Figure and ground (pounded in a mortar) with a finer grain size distribution according to FIG. 1.
4. TS 30 sewage sludge (KS-TS 30), obtained by the mechanical drainage of a domestic sewage sludge to a dry substance content of 30% by weight.

Figure 1:
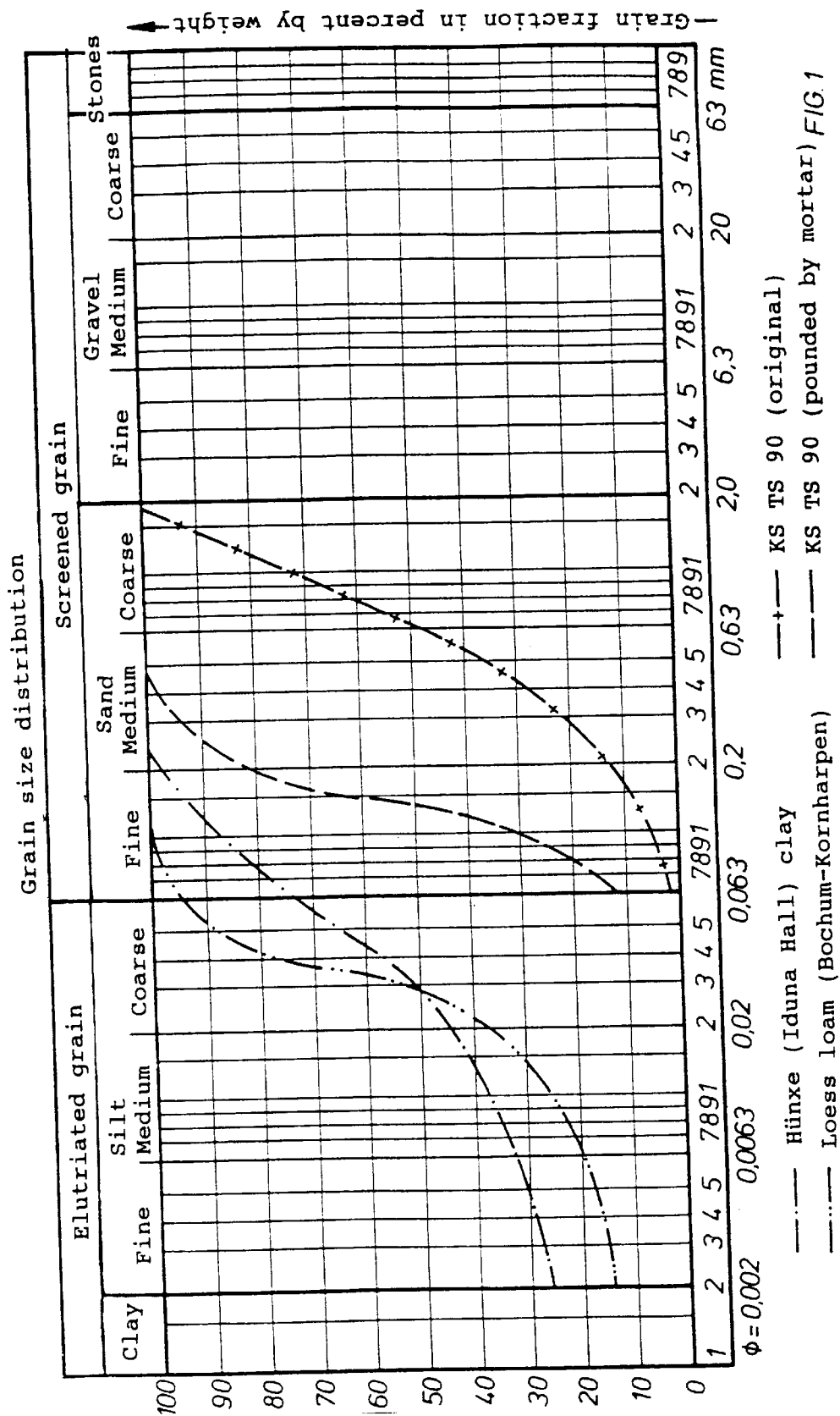
FIG. 1 shows the grain size distributions of the raw materials used, namely clay, loess loam and TS 90 sewage sludge, unground and ground.

The shrinkage tests were conducted to DIN 18122 Part 2/1987. In these, the moist soil mixture is scraped, free of air voids, into a ring mold having an inside diameter of 70 mm and a height of 14 mm. The ring filled with the soil is subsequently weighed (covered with a glass plate) in order to determine the initial water content. After initial drying at room temperature, drying is then carried out in the drying kiln at 105° C. to mass constancy. The water which has escaped is obtained from the weighing differences. The shrinkage is determined by measuring the dry test specimen.

To demonstrate the favorable influence of dry sludge, in comparison with wet sludge, on the shrinkage behavior of cohesive soils, two parallel test series were conducted, on the one hand with a fine-sandy loess loam with a grain size distribution according to the Figure (originating from Bochum-Kornharpen), and on the other hand with clay from a clay pit at Hünxe with a grain size distribution according to the Figure, specifically, in each case, with TS 90 sludge and TS 30 sludge. In these tests, on the one hand, care had to be taken to ensure an identical initial water content of the specimens to be compared, since, with an increasing water content, the shrinkage values of the soil mixture also rise. On the other hand, in order to bring about comparable conditions, the sludge content (in relation to dry substance) was also to be identical in the soil mixtures to be compared. These conditions were produced in such a way that, when TS 30 sludge was used, after its addition for the purpose of achieving identical ratios of sludge dry substance (100% dry) to soil dry substance (100% dry), the greatly increased water content of the mixture first obtained was brought, by redrying in a circulating-air kiln at 60° C., to the water content of the comparative specimen obtained with TS 90 sludge.

The results are collated in Tables I and II, the following needing to be pointed out.

In soil mechanics, the water content is not related to the total quantity of the moist soil mixture, but to the soil dry substance. 1500 g of a moist soil with a water content of 25% therefore contain 300 g of water and 1200 g of soil dry substance. However, in conventional reckoning (water content in relation to total quantity), this water content of 25% by weight, expressed in terms of soil mechanics, corresponds only to a water content of 20% by weight. Since, as regards the data listed in the Tables, the reckoning in terms of soil mechanics easily leads to confusion, the water content was always calculated on the total quantity. However, the water content calculated in terms of soil mechanics is in each case indicated in brackets.

TABLE I

| Loess loam | | | |
|---|---|---|---|
| Total quantity, g | 1500 | 1500 | 1500 |
| Dry substance | 1200 | 1200 | 1250 |
| Water, g | 300 | 300 | 250 |
| Water content, % by weight | 20.0 (25.0) | 20.0 (25.0) | 16.7 (20.0) |
| Physical form | pulpy, non-compactible | pulpy, non-compactible | easily compactible |
| k-value m · s$^{-1}$ | | | 8 · 10$^{-10}$ |
| Shrinkage, % by volume | 8.9 11.2 | 8.9 11.2 | 6.2 7.1 |
| Average, % by volume | 10.1 | 10.1 | 6.7 |
| TS 90 sewage sludge | | +20% KS-TS 90 | +20% KS-TS 30 |
| Sludge, g | | 267 | 800 |
| Sludge dry substance, g | | 240 | 240 |
| Water, g | | 27 | 560 |
| Total dry substance, g | | 1440 | 1440 |
| Total water, g | | 327 | 860 |
| Water content, % by weight | | 18.5 (22.7) | 37.4 (59.7) |
| Physical form | | easily compactible | pulpy, non-compactible, redrying to total quantity 1763 g |
| Water content, % | | 18.5 (22.7) | 18.3 (22.5) |
| Physical form | | very easily compactible | easily compactible |
| k-value, m · s$^{-1}$ | | 8 · 10$^{-10}$ | 10 · 10$^{-10}$ |
| Shrinkage, % by volume | | 2.7 ground 3.5 unground | 8.9 11.2 |
| Average | | 2.9 | 10.1 |

TABLE II

| Clay | | | |
|---|---|---|---|
| TOTAL QUANTITY, G | 1500 | 1500 | 1500 |
| Dry substance | 1111 | 1111 | 1188 |
| Water, g | 389 | 389 | 312 |
| Water content, % by weight | 25.9 (35.0) | 25.9 (35.0) | 20.8 (26.3) |
| Physical form | pulpy, non-compactible | pulpy, non-compactible | compactible, soft |
| k-value, m · s$^{-1}$ | | | 8 · 10$^{-11}$ |
| Shrinkage, % by volume | 23.6 26.1 | 23.6 26.1 | 20.8 22.8 |
| Average, % by volume | 24.9 | 24.9 | 21.8 |
| TS 90 sewage sludge | | +20% KS-TS 90 | +20% KS-TS 30 |
| Sludge, g | | 247 | 740 |
| Sludge dry substance | | 222 | 222 |
| Water, g | | 25 | 518 |
| Total dry substance, g | | 1333 | 1333 |
| Total water, g | | 414 | 907 |
| Water content, % by weight | | 23.7 (31.1) | 40.5 (68.0) |
| Physical form | | easily compactible | pulpy, non-compactible, redrying to |

TABLE II-continued

| | Clay | |
|---|---|---|
| | | total quantity 1746 g |
| Water content, % | 23.7 (31.1) | 23.7 (31.1) |
| Physical form | very easily compactible | easily compactible |
| k-value, m · s$^{-1}$ | 8 · 10$^{-11}$ | 3 · 10$^{-10}$ |
| Shrinkage, | 9.6 ground | 19.5 |
| % by volume | 12.0 unground | 21.3 |
| Average | 10.8 | 20.4 |

It can be inferred, in the first place, from Tables I and II that the shrinkage of a soil increases with a rising water content, the shrinkage being altogether very much more pronounced in the case of clay than in the case of loess loam. Thus, for example, loess loam (see Table I, lines 4 and 7/8), with a water content of 16.7%, has a shrinkage of 6.7% by volume which, with a water content of 20.0%, rises to 10.1% by volume. In contrast to this (see Table II, lines 4 and 7/8), in the case of clay, the shrinkage is 21.8% by volume with a water content of 20.8% and is 24.9% by volume with a water content of 25.9%.

The loess loam in Table I had a water content of 20.0% and was therefore oversaturated with water. With this water content of 20.0%, the loess loam has a pulpy physical form and is non-compactible. The installed water content of loess loam at a Proctor density of 95% (in the wet range of the Proctor curve) is around 17.5% (in terms of soil mechanics: 21.2%).

With the loess loam oversaturated with water, mechanically compactible, plastically deformable bodies were obtained by the addition of 10% by weight of dry sludge (KS-TS 90), calculated on sludge dry substance and in relation to soil dry substance. Good machine compaction could be produced with the addition of 15% by weight of dry sludge. The earth body corresponded, in terms of compactibility, to a natural loess loam with an optimum water content of about 14% (from the point of view of compactibility). A dry sludge content of 20% by weight resulted in a very dry earth body which was very easily compactible and which, even under the most intensive mechanical compaction, discharged no water (corresponding to about 95% Proctor density in the dry branch of the Proctor curve).

The clay of Table II, with a water content of 25.9%, is likewise noncompactible as a consequence of its pulpy consistency. Here, mechanical compactibility was already achieved with an added quantity of 10% by weight of KS-TS 90. However, the soil still had high plastic deformability. With an added quantity of 15% by weight, the soil material could be easily compacted. The addition of 20% by weight of aggregate greatly increased the compactibility. Even under the most intensive mechanical compaction, the soil no longer discharged any water (corresponding to about 95% Proctor density in the dry branch of the Proctor curve).

Tables I and II show the pronounced improvement in the shrinkage behavior of cohesive soils when TS 90 dry sludge is added. Natural loess loam has a shrinkage of 6.7% by volume with a water content of 16.7% and a shrinkage of 10.1% by volume with a water content of 20.0% (Table I, column 4, lines 4 and 8). After the addition of 20% KS-TS 90, the shrinkage of the soil mixture obtained is only 2.9% by volume with a water content of 18.5% (Table I, column 2, lines 1 and 5 from bottom), that is to say the shrinkage has been reduced to less than half. In contrast, when the same quantity (calculated on dry substance) of KS-TS 30 is added, no improvement in the shrinkage behavior can be achieved; the corresponding soil mixture has a shrinkage of 10.1% by volume with a water content of 18.3% (Table I, column 3, lines 1 and 5 from bottom).

A similarly pronounced improvement in the shrinkage behavior is also to be observed in clay. On the evidence of Table II, natural clay, with a water content of 20.8%, has a shrinkage of 21.8% (column 4, lines 4 and 7/8). After the addition of 20% KS-TS 90, the shrinkage fell to a value of only 10.8% (Table II, column 2, last line), this being so even though the water content of the soil mixture at 23.7% is markedly higher than the water content of pure clay (20.8%). This improvement in the shrinkage behavior cannot be achieved with a wet sludge KS-TS 30 (shrinkage 20.4% in comparison with only 10.8% with KS-TS 90), even though some improvement in comparison with the initial clay is to be observed.

In the following statements, $W_{opt}$ represents the water content at the summit of the Proctor curve, that is to say the water content in the case of optimum compactibility, W 95% dry represents the water content at a Proctor density of 95% in the dry branch of the Proctor curve, and W 95% wet represents the water content at a Proctor density of 95% in the wet branch of the Proctor curve, see FIG. 2.

The Proctor values in terms of soil mechanics for the loess loam of Table I are given in the following Table III.

TABLE III

| | Loess loam | |
|---|---|---|
| Parameter | Water content (%) | Water content in of soil mechanics % |
| $W_{opt}$ | 14.2 | 16.6 |
| W 95% dry | 12.1 | 13.8 |
| W 95% wet | 17.5 | 21.2 |

As emerges from Table I, the loess loam is easily compactible with a water content of 16.7% (20.0%). With a water content of 20.0% (25.0%), it is pulpy and non-compactible. With a water content of 18.5% (22.7%), this material is already softened to such an extent that it can no longer be processed mechanically. In contrast to this, the soil mixture mixed with KS-TS 90 is very easily compactible with a water content of 18.5% (22.7%). Even under the most intensive mechanical compaction, this soil mixture no longer discharges any water; its composition corresponds to about 95% compactibility of the dry branch of the Proctor curve. In other words, in contrast to the initial loess loam, which, with a water content of 16.7% (20.0%), is already in the wet branch of the Proctor curve (a water content of 17.5% (21.2%) corresponds to 95% Proctor density wet) and, even under the effect of a brief rainfall, as a result of water absorption reaches the point in the wet branch of the Proctor curve where mechanical processing is no longer possible (92% Proctor density wet), the soil mixture of column 2 of Table I, mixed with dry sludge KS-TS 90, has so much "water reserve" that, under the effect of rain, there is at first even an increase in compactibility up to the summit of the Proctor curve. This material can then absorb still further water (in the wet branch of the Proctor curve), whilst maintaining very good compactibility, up to a water content corresponding to W 95% wet. Thus, by adding dry sludge to the soil, the water tolerance of the latter is increased, and the Proctor curve is shifted as a whole to the right towards higher water contents. In this there is a further critical advantage of the method of the invention. Hitherto, when a loess loam according to the last column of Table I has been used, beyond a particular precipitation effect only the following possibilities have remained. Either the construction site had to be protected from further precipitations by protective tents or the work had to be discontinued until the loess loam had become mechanically processible again. A soil exchange could also be carried out or, finally, the overwetted soil could be redried to an acceptable water content in a circulating-air kiln. It is immediately clear that all these measures incur tremendous costs which either occur directly as a result of the use of material and energy or are indirectly associated with the loss of time (shutdown of the construction site for an indefinite period).

The ratios in the case of clay (see Table II) are also similar to those in the case of loess loam. The Proctor values in terms of soil mechanics are given in Table IV.

TABLE IV

Clay

| Parameter | Water content (%) | Water content in terms of soil mechanics % |
|---|---|---|
| $W_{opt}$ | 18.1 | 22.1 |
| W 95% dry | 15.9 | 18.9 |
| W 95% wet | 21.3 | 27.1 |

The initial clay of Table II is pulpy and non-compactible with a water content of 25.9% (35.0%). With a water content of 20.8% (26.3%), the clay, although compactible, is nevertheless already soft. It follows already from a comparison of these values that, with a water content of 23.7% (31.1%), the clay has become very soft and is at the limit of being too pulpy. There can therefore be no mechanical processibility under any circumstances. In contrast to this, with this water content of 23.7% (31.1%), the soil mixture mixed with dry sludge KS-TS 90 is very easily compactible. Even under the most intensive mechanical compaction, this soil mixture no longer discharges any water. It corresponds to about 95% Proctor density in the dry branch of the Proctor curve and therefore has comparable "water reserve" to the loess loam KS-TS 90/soil mixture of Table I.

With regard to the sealing property of the soils mixed with dry sludge, the k-values listed in Tables I and II show that the addition of the dry sludge causes no impairment in the sealing effect of the soil. The following tests were also conducted in this respect.

The sealing values are determined to DIN 18127. In this, a given soil is introduced into a cylinder (Proctor pot) and is rammed in with standardized energy. Depending on the water content of the soil, a specific compaction of the soil is then obtained. The determined densities of the soil and the density values assigned to the different water contents give the so-called Proctor curve with a density maximum for a specific water content and with density values, descending on both sides of this maximum, for lower water contents (dry range) and higher water contents (wet range) respectively. In this case, to achieve better sealing values, work is preferably carried out in the wet range of the Proctor curve.

Figure 2:
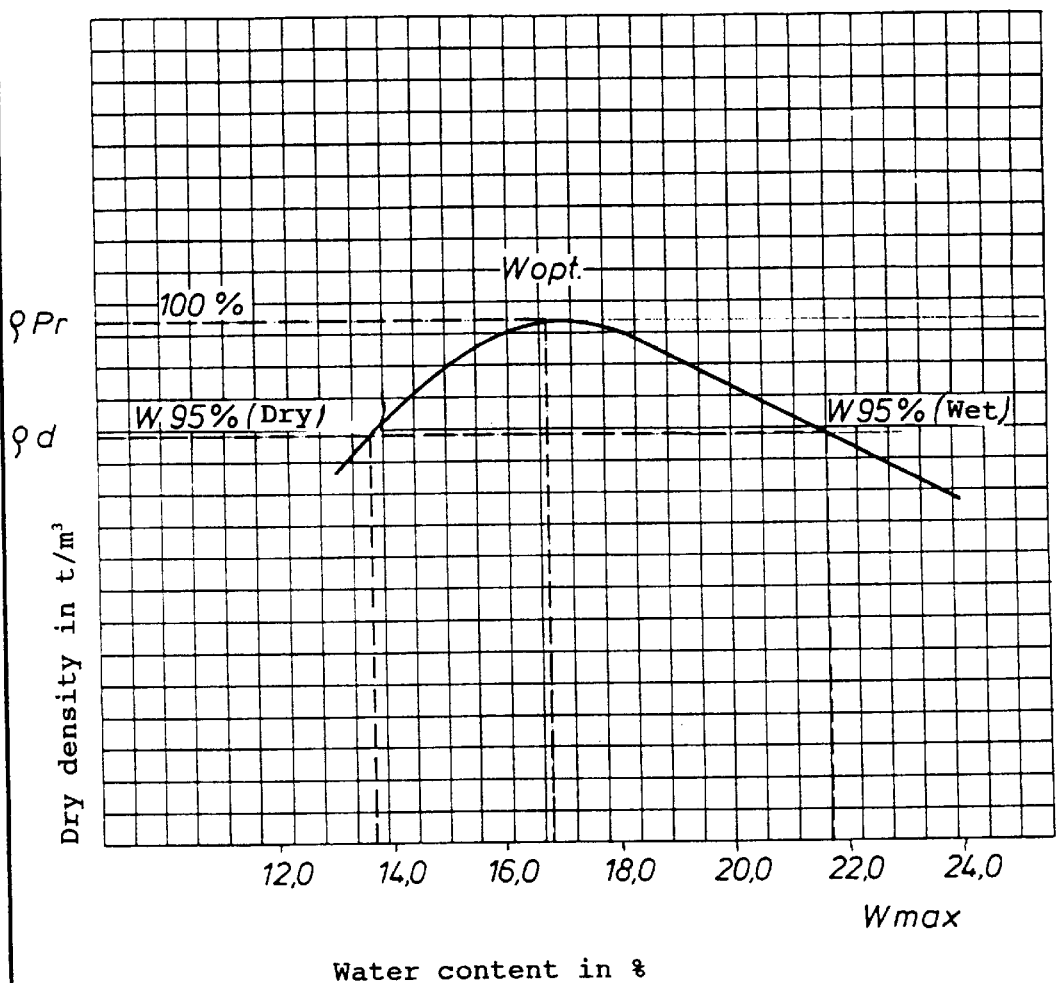
FIG. 2 shows the Proctor curve of the loess loam, that is to say the dependence of the compactability of the loess loam on its water content.

FIG. 2 shows the Proctor curve for the loess loam of Table I (see also FIG. 1), that is to say the dependence of the compactibility of the loess loam on the water content (all water contents are given in terms of soil mechanics). The highest compactibility (100%) is given at a water content ($W_{opt}$) of 16.6%. The summit of the curve is located here. The dry branch of the Proctor curve extends to the left, that is to say towards lower water contents, and the wet branch of the Proctor curve extends to the right, that is to say towards higher water contents. Good compaction of the soil is given up to a Proctor density of 95%, that is to say the loess loam is easily processible mechanically at water contents of 13.8 to 21.2%. Beyond a Proctor density of 92%, there is no longer mechanical processibility.

From the point of view of the installation properties and achievable sealing properties, work is preferably carried out in the wet range of the Proctor curve. It can be seen, however, that a soil mixture located in the dry branch of the Proctor curve has greater flexibility in terms of water absorption. In particular, whereas the loess loam is easily compactible mechanically at a water content of 21.2%, corresponding to 95% Proctor density in the wet branch of the Proctor curve, this compactibility decreases in the event of even relatively slight water absorption, until it falls below the value of 92% Proctor density and there is consequently no longer mechanical processibility. In contrast to this, with a water content of 13.8%, corresponding to 95% Proctor density in the dry branch of the Proctor curve, the loess loam has considerable water absorbency, the compactibility initially even increasing (up to a water content of 16.6%) and then still remaining very good up to a water content of 21.2%.

The loess loam of Table I (see also FIG. 1) has a coefficient of permeability of $k=8 \cdot 10^{-10}$ m·s$^{-1}$ at a Proctor density of 95% in the wet branch of the Proctor curve. The corresponding value for the clay of Table II (see also FIG. 1) is $8 \cdot 10^{-11}$ m·s$^{-1}$. The coefficients of permeability achieved with loess loam and clay by the addition of dry sludge are collated in Table V. Furthermore, Table V contains those values which were obtained with the additional use of pulverulent water glass. In this case, the water glass was used in a quantity such that a 5 percent water glass solution occurred in the soil water.

TABLE V

| | k-value loess loam m · s$^{-1}$ | k-value loess loam + 5% water glass m · s$^{-1}$ | k-value clay m · s$^{-1}$ |
|---|---|---|---|
| Addition of KS-TS 90 % | | | |
| unground | | | |
| 0 | 8.0 · 10$^{-10}$ | | 8.0 · 10$^{-11}$ |
| 10 | 7.5 · 10$^{-10}$ | 9.5 · 10$^{-11}$ | 8.4 · 10$^{-11}$ |
| 15 | 6.0 · 10$^{-10}$ | 7.3 · 10$^{-11}$ | 7.2 · 10$^{-11}$ |
| 20 | 8.0 · 10$^{-10}$ | 8.2 · 10$^{-11}$ | 8.7 · 10$^{-11}$ |
| ground | | | |
| 0 | 8.0 · 10$^{-10}$ | | |
| 10 | 4.0 · 10$^{-10}$ | 8.6 · 10$^{-11}$ | 6.1 · 10$^{-11}$ |
| 15 | 2.5 · 10$^{-10}$ | 4.7 · 10$^{-11}$ | 5.4 · 10$^{-11}$ |
| 20 | 3.5 · 10$^{-10}$ | 6.8 · 10$^{-11}$ | 5.9 · 10$^{-11}$ |
| Addition of KS-TS 70 % | | | |
| unground | | | |
| 17.5 | 6.2 · 10$^{-10}$ | 7.5 · 10$^{-11}$ | 7.7 · 10$^{-11}$ |
| ground | | | |
| 17.5 | 2.4 · 10$^{-10}$ | 5.2 · 10$^{-11}$ | 5.7 · 10$^{-11}$ |

As emerges from Table V, the addition of dry sludge basically entails no impairment in the sealing properties. Rather, in the case of ground dry sludge, even an improvement in the k-values of almost half a power of ten is achieved. In this case, the sealing values can be further improved by at least one power of ten by the additional use of water glass. In the case of clay, the initial material already has a very low k-value of $8 \cdot 10^{-11}$ m·s$^{-1}$. This considerably surpasses the set requirements of the TA Waste and TA Domestic Waste of $1 \cdot 10^{-10}$ m·s$^{-1}$, so that, in the case of clay, no further improvement by the addition of water glass is necessary. The latter would be advisable when even lower values than $8 \cdot 10^{-10}$ m·s$^{-1}$ were to constitute the quality criterion for the purpose of the sealing of pore spaces and therefore for the retention of harmful substances in clayey soils in the very long term. An equivalent, but substantially more cost-effective alternative to the so-called combination seal at the dump base would then consequently be provided.

The following also emerges from Table V in conjunction with Tables I and II. Admittedly, at first, there is no improvement in the k-values as a result of the addition of dry sludge to cohesive soils. Nevertheless, it was found that soils mixed with dry sludge have greater flexibility in terms of water content, in that excellent sealing values can be achieved. In particular, whereas, in the case of natural soils, for example loess loam or clay, the k-value at a Proctor density of 95% in the dry branch of the Proctor curve is regularly about half a power of ten lower than at a Proctor density of 95% in the wet range of the Proctor curve, this cannot be observed in the case of the soils mixed with dry sludge. The k-values are just as good in the dry branch of the Proctor curve as in the wet branch. This represents a further considerable advantage for construction site practice.

In order to examine an environmentally compatible encapsulation of organic and inorganic harmful substances contained in polluted soils, an artificial soil mixture was produced as follows.

30 parts by weight of loess loam, water content 16.7 (20%), with an addition of pulverulent water glass (Deposil N) in a quantity such that a 5 percent water glass solution is obtained, 20 parts by weight of TS 90 sewage sludge and 50 parts by weight of Fuller's earth with a medium-viscosity to high-viscosity mineral oil fraction of 15%, 50 mg/kg PCB, 68 mg/kg chrome VI, 180 mg/kg copper and 1250 mg/kg zinc.

The mixture was then mixed with water to achieve optimum compactibility. After compaction, the compacted bodies were left to stand for one week. The eluate behavior was subsequently determined on cylindrical specimens having a diameter of 10 cm and a height of 10 cm, with rainwater of pH 4 and distilled water of pH 7. The values given in Table VI were obtained during an eluate time of 3 weeks, and no differences could be established between rainwater and distilled water.

TABLE VI

Elution of soil polluted with harmful substances

| Elution day | Mineral oil (mg/l) | PCB (µg/l) | Copper (mg/l) | Chrome VI (mg/l) | Zinc (mg/l) |
|---|---|---|---|---|---|
| 1 | 0.3 | <0.01 | 0.04 | 0.02 | 0.02 |
| 2 | 0.1 | <0.01 | 0.03 | 0.02 | <0.01 |
| 3 | 0.1 | <0.01 | <0.01 | <0.01 | <0.01 |
| 4 | 0.2 | <0.01 | <0.01 | <0.01 | <0.01 |
| 8 | 0.1 | <0.01 | <0.01 | <0.01 | <0.01 |
| 9 | <0.1 | <0.01 | <0.01 | <0.01 | <0.01 |
| 10 | 0.1 | <0.01 | <0.01 | <0.01 | <0.01 |
| 11 | 0.1 | <0.01 | <0.01 | <0.01 | <0.01 |
| 15 | 0.1 | <0.01 | <0.01 | <0.01 | <0.01 |
| 16 | 0.1 | <0.01 | <0.01 | <0.01 | <0.01 |
| 17 | 0.2 | <0.01 | <0.01 | <0.01 | <0.01 |
| 18 | 0.1 | <0.01 | <0.01 | <0.01 | <0.01 |
| 22 | 0.1 | <0.01 | <0.01 | <0.01 | <0.01 |
| 23 | 0.1 | <0.01 | <0.01 | <0.01 | <0.01 |

Table VI shows the excellent encapsulation of organic and inorganic harmful substances. The elution behavior corresponds to Dump Class 1 (noncontaminated water).

I claim:

1. A method for the sealing of soil formations, the method comprising:

applying a mineral sealing layer, said mineral sealing layer comprising a cohesive soil and an aggregate, to a soil formation and then mechanically compacting the mineral sealing layer, wherein the aggregate used is dry sewage or water sludge with a dry substance content of at least 70% by weight in a quantity of 5 to 50% by weight in relation to sludge dry substance and calculated on the dry weight of the soil.

2. The method as claimed in claim 1, wherein the dry sludge is used in a quantity of 10 to 30% by weight.

3. The method as claimed in claim 2, wherein the dry sludge is used in a quantity of 15 to 25% by weight.

4. The method as claimed in one of the preceding claims, wherein the dry sludge is used in ground form with a grain size of below 0.6 mm.

5. The method as claimed in claim 1, wherein dry sludge with a dry substance content of 80% by weight or higher is used.

6. The method as claimed in claim 5, wherein an overwetted soil is used and the dry sludge is added in a quantity such that the soil mixture obtained is easily compactible mechanically.

7. The method as claimed in claim 5, wherein pulverulent water glass is added to the sealing mixture in a quantity such as to result in a 3 to 10% by weight water glass solution in the soil water of the sealing mixture.

8. The method as claimed in claim 5, wherein dry sludge and water glass are mixed with the cohesive soil in one operation.

9. The method as claimed in claim 1, wherein dry sludge with a dry substance content of 90% by weight or higher is used.

10. The method as claimed in claim 9, wherein an overwetted soil is used and the dry sludge is added in a quantity such that the soil mixture obtained is easily compactible mechanically.

11. The method as claimed in claim 9, wherein pulverulent water glass is added to the sealing mixture in a quantity such as to result in a 3 to 10% by weight water glass solution in the soil water of the sealing mixture.

12. The method as claimed in claim 9, wherein dry sludge and water glass are mixed with the cohesive soil in one operation.

13. The method as claimed in claim 1, wherein an overwetted soil is used and the dry sludge is added in a quantity such that the soil mixture obtained is easily compactible mechanically.

14. The method as claimed in claim 13, wherein pulverulent water glass is added to the sealing mixture in a quantity such as to result in a 3 to 10% by weight water glass solution in the soil water of the sealing mixture.

15. The method as claimed in claim 13, wherein dry sludge and water glass are mixed with the cohesive soil in one operation.

16. The method as claimed in claim 1, wherein pulverulent water glass is added to the sealing mixture in a quantity such as to result in a 3 to 10% by weight water glass solution in the soil water of the sealing mixture.

17. The method as claimed in claim 16, wherein dry sludge and water glass are mixed with the cohesive soil in one operation.

18. The method as claimed in claim 1, wherein dry sludge and water glass are mixed with a cohesive soil in one operation.

19. The method as claimed in claim 2, wherein dry sludge with a dry substance content of 80% by weight or higher is used.

20. The method as claimed in claim 2, wherein dry sludge with a dry substance content of 90% by weight or higher is used.

21. The method as claimed in claim 2, wherein an overwetted soil is used and the dry sludge is added in a quantity such that the soil mixture obtained is easily compactible mechanically.

22. The method as claimed in claim 2, wherein pulverulent water glass is added to the sealing mixture in a quantity such as to result in a 3 to 10% by weight water glass solution in the soil water of the sealing mixture.

23. The method as claimed in claim 2, wherein dry sludge and water glass are mixed with the cohesive soil in one operation.

24. The method as claimed in claim 3, wherein dry sludge with a dry substance content of 80% by weight or higher is used.

25. The method as claimed in claim 3, wherein dry sludge with a dry substance content of 90% by weight or higher is used.

26. The method as claimed in claim 3, wherein an overwetted soil is used and the dry sludge is added in a quantity such that the soil mixture obtained is easily compactible mechanically.

27. The method as claimed in claim 3, wherein pulverulent water glass is added to the sealing mixture in a quantity such as to result in a 3 to 10% by weight water glass solution in the soil water of the sealing mixture.

28. The method as claimed in claim 3, wherein dry sludge and water glass are mixed with the cohesive soil in one operation.

29. The method as claimed in claim 4, wherein dry sludge with a dry substance content of 80% by weight or higher is used.

30. The method as claimed in claim 4, wherein dry sludge with a dry substance content of 90% by weight or higher is used.

31. The method as claimed in claim 4, wherein an overwetted soil is used and the dry sludge is added in a quantity such that the soil mixture obtained is easily compactible mechanically.

32. The method as claimed in claim 4, wherein pulverulent water glass is added to the sealing mixture in a quantity such as to result in a 3 to 10% by weight water glass solution in the soil water of the sealing mixture.

33. The method as claimed in claim 4, wherein dry sludge and water glass are mixed with the cohesive soil in one operation.

\* \* \* \* \*